Feb. 25, 1969    JAMES E. WEBB    3,429,177
ADMINISTRATOR OF THE NATIONAL AERONAUTICS
AND SPACE ADMINISTRATION
METHOD FOR DETECTING HYDROGEN GAS
Filed April 15, 1966

INVENTORS
ALBERT C. KRUPNICK,
DANIEL P. LUCERO

BY

Charles C. Wells

ATTORNEYS

# United States Patent Office 3,429,177
Patented Feb. 25, 1969

3,429,177
METHOD FOR DETECTING HYDROGEN GAS
James E. Webb, Administrator of the National Aeronautics and Space Administration with respect to an invention of Albert C. Krupnick, Huntsville, Ala., and Daniel P. Lucero, Placentia, Calif.
Filed Apr. 15, 1966, Ser. No. 543,774
U.S. Cl. 73—24                         5 Claims
Int. Cl. G01n 29/02, 25/00, 31/00

ABSTRACT OF THE DISCLOSURE

A hydrogen gas detector comprising a pair of detector transducers, each of which includes a transmitter and receiver separated by an airgap. An acoustic wave of 1 mc. p.s. is transmitted across the airgap of one transducer and a 10 mc. p.s. wave, the thermal molecular relaxation frequency of hydrogen, is transmitted across the airgap of the other transducer. The presence of hydrogen in the gas mixture in the airgap will result in an increase in the velocity of the 10 mc. p.s. wave, but not in the velocity of the 1 mc. p.s. wave. The detector includes electronic apparatus for comparing and detecting any change in the velocity of the two waves and thereby also detecting the presence of hydrogen gas.

---

The invention described herein was made in the performance of work under a NASA contract and is subject to the provisions of Section 305 of the National Aeronautics and Space Act of 1958, Public Law 85–568 (72 Stat. 435; 42 VSC 4257).

This invention relates in general to methods and apparatus for analyzing a gas mixture to detect the presence of a particular gas. More specifically this invention is a method of detecting only the presence of hydrogen gas in a gas mixture and the method is insensitive to all other gases. The measurement is accomplished by measuring a change in the acoustic velocity of a gas mixture due to the thermal relaxation properties of hydrogen.

The detection of hydrogen, particularly hydrogen leaks is of vital importance to the space program in the testing, launching and operation of space vehicles which utilize liquid hydrogen as a fuel. As is well known, liquid hydrogen is extremely flammable and very explosive when combined in small quantities with air. The two characteristics combined with the high diffusion rate characteristic of hydrogen through materials and crevices, makes it mandatory that all hydrogen leaks in a static test facility, a space vehicle prior to launch or in flight, or any other area where hyrogen gas may accumulate, be detected.

The problem of detecting hydrogen in such an environment is complicated by the fact that other gases are often combined with the hydrogen. For example, in order to reduce the fire and explosive hazards surrounding facilities or equipment utilizing cryogenic hydrogen, a purge gas is used around the liquid hydrogen containers. Helium for instance, is used to purge hydrogen and oxygen from the insulation surrounding the fuel tanks of a space vehicle prior to launch. Also, due to the large concentration of oxygen normally surrounding a space vehicle test or launch facility, hydrogen will be mixed with an oxygen atmosphere. Thus, it is apparent that any method or apparatus for detecting hydrogen must be very specific to hydrogen and insensitive to all other gases. In addition to having a high degree of specificity to hydrogen in the presence of other gases, such method and apparatus, particularly for use on a space vehicle, must be lightweight and highly reliable, and furthermore, must not in itself present a fire or explosion hazard when in contact with stoichiometric mixtures of hydrogen and other gases.

Methods and apparatus in use heretofore to analyze a gas mixture for hydrogen have been numerous, including for example, mass spectrometry, gas chromatography, combustibles, adding a radioactive tracer like tritium to the cryogenic hydrogen and detecting leaks by a radiation detector, and utilizing a palladium sensor. These various techniques and devices are all useful and satisfactory for some application, but have limitations of one kind or another which makes them unsuitable for use in the space program.

A mass spectrometer for instance can be made highly specific to hydrogen provided the atmosphere or gas mixture being tested does not contain large amounts of hydrocarbon or water. Their presence could result in an erroneous analysis. Furthermore, mass spectrometers are too bulky and complex for use on a space vehicle.

Infrared devices employed as gas detectors transmit infrared waves through a gaseous medium to be analyzed and the content of the medium is determined by measuring the infrared absorption. Infrared detection however, requires a change in dipole moment to absorb infrared radiation. Elemental gas forms such as hydrogen, nitrogen, helium, etc. do not go through a dipole moment change during energy absorption. Thus, infrared techniques cannot be used to detect such gases.

Thermal conductivity devices utilize a current passed through a conductor wire in the gaseous medium being analyzed. The change in resistance in the conductor is indicative of the composition of the medium. Such devices are not suitable for many space applications because they lack specificity to hydrogen in some circumstances and present an explosion hazard.

There are also in existence devices which measure the changes in velocities of acoustic waves when its apparent molecular weight changes because of changes in the chemical composition of the gas being analyzed. The apparent molecular weight change of the medium is due to the instantaneous short term change in molecular weight due to broad banded acoustic frequency absorption. Such devices will make measurements operating over a broad band of frequencies and any gas will affect the operation thereof. In other words, the prior art acoustic devices will detect the concentration of any known gas but will not discriminate various gases.

The invention avoids the disadvantages discussed above and provides a method which can be employed to detect the presence of hydrogen on board a space vehicle or in the area surrounding a launch facility. The invention can also be employed in cracking plants, mines, or other areas where the accumulation of hydrogen gas presents a potential hazard.

A method in accordance with this invention basically comprises the following procedure for detecting hydrogen. In a detector transducer including an ultrasonic transmitter and receiver separated by an airgap, an acoustic wave having a frequency of 1 mc. p.s. (megacycles per second) is transmitted across the airgap. The acoustic wave is received and the receiver generates an electric signal which is fed to suitable electronic apparatus, discussed hereafter, that monitors and compares the acoustic velocity of the transmitted wave to that of a second acoustic wave discussed below.

A second and identical detector transducer is employed in which the acoustic wave or signal is transmitted at a frequency of 10 mc. p.s. The 10 mc. p.s. wave is received by an ultrasonic receiver which generates an electrical signal that is fed into suitable electronic apparatus, discussed hereafter, that compares the velocity of the two acoustic waves and detects any change in velocity of the 10 mc. p.s. acoustical wave as it passes through an airgap of the second detector transducer.

It has been determined that the velocity of both the 1 mc. p.s. and 10 mc. p.s. acoustical wave across the airgaps of their respective transducers will be identical so long as there is an absence of hydrogen gas in the gas mixture present in the airgaps. However, it has further been determined that the presence of hydrogen gas in the air mixture in very small quantities, .1% and less, will result in a considerable and detectable increase in the velocity of the 10 mc. p.s. acoustic wave as it travels across the airgap in the second detector transducer. The presence of hydrogen in the airgap of the first detector transducer does not affect the velocity of the 1 mc. p.s. acoustic wave.

It is deemed obvious that this invention provides a method that is a novel and unique approach to monitoring a gaseous medium to immediately ascertain the introduction of hydrogen thereto.

It is therefore an object of this invention to provide a new and improved method of detecting the presence of a particular gas in a gaseous mixture.

Another object of this invention is to provide a method of monitoring a gaseous mixture that will detect only the presence of hydrogen.

A further object of this invention is to provide a method of detecting the presence of hydrogen in a gas mixture by acoustical means.

Yet another object of this invention is to provide a method of detecting the presence of hydrogen in a gaseous mixture by measuring the velocity of an acoustic wave transmitted through a gaseous mixture at the thermal relaxation frequency of hydrogen and comparing it to the velocity of an acoustic wave transmitted through the same gaseous mixture at a frequency considerably lower than the thermal relaxation frequency of hydrogen.

Other objects and attendant advantages of the present invention will become more apparent when considering the following detailed description in conjunction with the attached drawing wherein.

Figure 1:
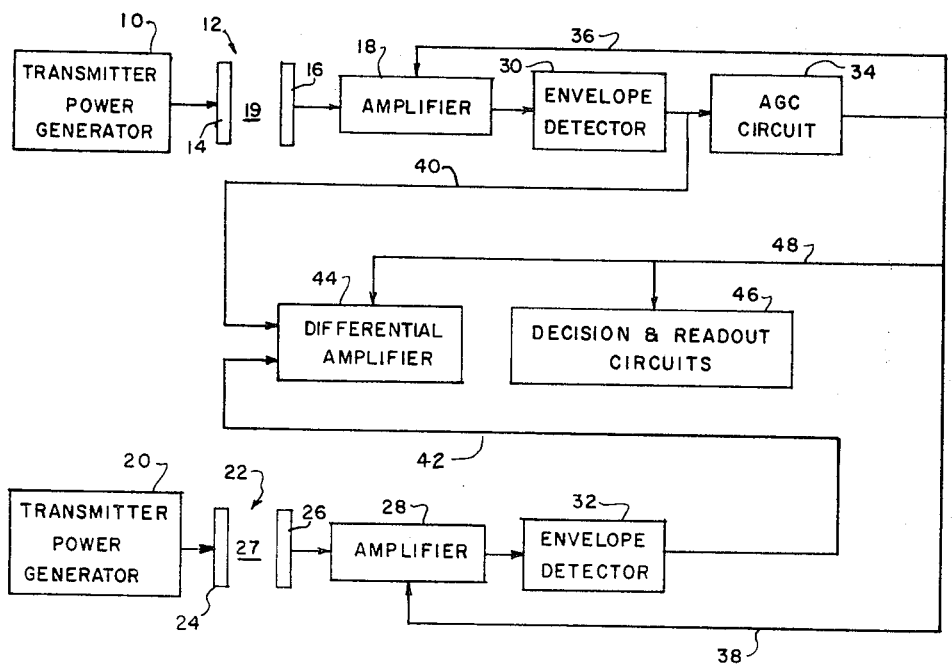
FIGURE 1 is a schematic arrangement of an apparatus suitable for use in practicing the present invention.

In FIGURE 1 of the drawing there is illustrated an apparatus suitable for use in practicing the novel method described herein. Inasmuch as the invention lies in the method and not the electronic apparatus employed in practicing the method the various components of the invention are illustrated in block form and will be described primarily by reference to their function with only general mention of the structure involved.

A transmitter power generator 10 is electrically connected to a transducer 12. Transducer 12 consists of a transmitter crystal 14 of a piezoelectric type which is caused to vibrate at a frequency that sets up a 1 mc. p.s. acoustic wave when an appropriate signal from power generator 10 is applied thereto. A receiver crystal 16, also of the piezoelectric type, is disposed a predetermined distance away from the transmitter crystal. The receiver crystal is excited by the acoustic waves or vibrations from the transmitter crystal and develops an electric signal in response thereto which is fed into an amplifier 18. In practice, the transmitter and receiver crystals are mounted in a free standing position in the area where it is desired to monitor for the presence of hydrogen. The distance between the two crystals defines an airgap as indicated at 19, containing the gaseous medium to be monitored.

A second transmitter power generator 20 is electrically connected to a second transducer 22 which is similar to transducer 12 except that transmitter crystal 24 of transducer 22 is driven so as to generate an acoustic wave having a frequency of 10 mc. p.s. The acoustic wave generated by transmitter crystal 24 is transmitted to a receiver crystal 26 across an airgap, indicated at 27, containing the gaseous medium or mixture to be monitored. Receiver crystal 26 is excited by the acoustic waves transmitted across the gaseous medium and generates an electric signal in response thereto which is fed into an amplifier 28. In actual use transducers 12 and 22 will be mounted relatively close to one another.

The acoustic waves passing through airgaps 19 and 27 are transmitted at a frequency of 1 mc. p.s. and 10 mc. p.s. respectively. Their velocities will be identical so long as there is no hydrogen present in the gaseous mixture in the airgap. The introduction of hydrogen into the gas mixture present in the airgap will result, for reasons discussed below, in a velocity increase in the 10 mc. p.s. acoustic wave while the velocity of the 1 mc. p.s. acoustic wave remains the same. Thus, by comparing the velocities of the two waves and detecting any increase in the acoustic velocity across airgap 27 it is possible to immediately detect the presence of hydrogen.

The output signal of receiver crystals 16 and 26 are fed into their respective amplifiers 18 and 28 where the signals are amplified and passed on to envelope detectors 30 and 32. Envelope detectors 30 and 32 are signal conditioning circuits of a known type which assure a pure signal to the instrument components they are connected into. The output of the envelope detector circuit 30 is connected into an automatic gain control circuit 34 whose output is in turn connected into amplifiers 18 and 28 through feedback lines 36 and 38 to control the gain thereof. The output signals from envelope detector circuits 30 and 32 are connected through leads 40 and 42 into a differential amplifier 44 where they are compared and an output signal generated which is indicative of any differences in the magnitude of the signal generated by the receiver crystals and thus the velocities of the acoustic waves traversing airgaps 19 and 27. The output of the differential amplifier is connected into appropriate decision and readout circuits 46 which displays the level of hydrogen concentration and provides for an audiovisual warning signal. The automatic gain control circuit is also connected into the differential amplifier and the decision and readout circuits through line 48 to control the gain thereof.

Figure 2:
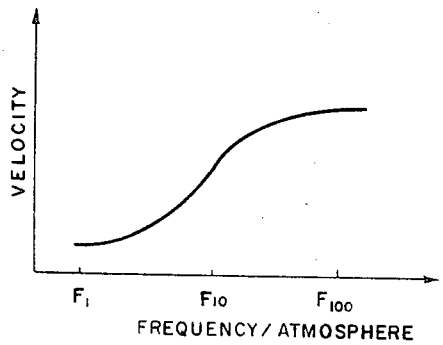
FIGURE 2 is a graphical illustration which relates the frequency and velocity characteristics of an acoustic wave traveling in a hydrogen-air gas mixture.

Referring now to FIGURE 2 where the relationship between the acoustic velocity and frequency of an acoustic wave in a hydrogen/air mixture is illustrated. It will be noted that the velocity is relatively constant at a frequency of 1 mc. p.s., indicated by $F_1$, whereas at 10 mc. p.s., indicated by $F_{10}$, the velocity is changing at its most rapid rate. It will also be noted that the curve flattens out again at 100 mc. p.s., indicated by $F_{100}$, indicating a relatively constant velocity.

Figure 3:
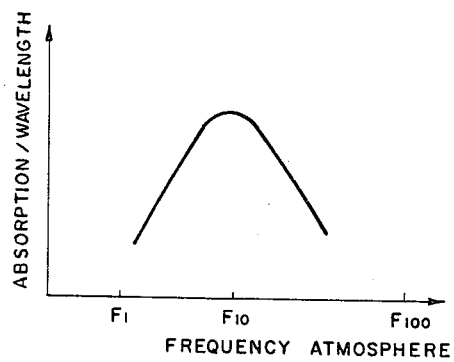
FIGURE 3 is a graphical illustration which relates the absorption of an acoustic wave traveling through a hydrogen-air gas mixture to its frequency.

FIGURE 3 illustrates the relationship between the frequency of the acoustic waves and the absorption thereof by the hydrogen/air mixture through which it is passing. It will be noted that the absorption at 10 mc. p.s., indicated by $F_{10}$, is at a maximum and large when compared to the absorption at 1 mc. p.s., indicated by $F_1$.

The theoretical basis of this method of detecting the presence of hydrogen lies in the phenomenon of molecular thermal relaxation of gases.

The law of equipartition of energy in gases states that the total energy of a system of molecules will be equally divided among all the degrees of freedom of the molecules. Each diatomic or polyatomic molecule has six degrees of freedom; three external degrees of freedom and three internal degrees of freedom. A monoatomic molecule has only the three external degrees of freedom. The external degrees of freedom are the three (XYZ) translational energy modes which are continuous in energy content, i.e., each translational energy mode can have any positive value of energy. The internal degrees of freedom consist of one vibrational energy mode and two rotational energy modes. The energy associated with the internal energy modes is quantized, i.e., the energy of each mode can have only discrete values. When a system consisting of a gas is thermodynamically disturbed, by the propagation of an acoustic wave therethrough, an aquilibrium condition is restored by thermal molecular collision and the energy in the system of molecules is thus redistributed in the internal and external degrees of freedom of the molecules until the average energy in each degree of freedom is identical.

Since the internal degrees of freedom are quantized, not every thermal molecular collision will have sufficient energy to induce a change in the energy level of the internal modes of a molecule as occurs with the external energy modes. Therefore, it will require a certain average number of collisions until a molecule with sufficient energy collides with another molecule and induces an energy level change in the internal modes. The number of collisions necessary to induce a change in the vibrational and rotational energy modes will depend upon the molecules involved and the quantum level of the internal energy modes before the collision. It becomes apparent that there will therefore be a certain probability of either changing or not changing the energy level of the vibrational and rotational modes of a molecule by molecular collision.

If the amount of energy of the translational energy modes of the molecules of a molecular system are increased or decreased, as occurs in the propagation of a sound wave, the energy of the external degrees of freedom will be equalized by relatively few collisions. However, it will require a much greater number of collisions for equilibrium to be established in the internal modes because of the smaller percentage of molecules available with sufficient energy to accomplish the internal quantum changes. If the period of the sound wave is much shorter (has a high frequency) than the time required for equilibrium to be established with the internal modes, then the internal degrees of freedom or energy modes of the molecules in the molecular system do not contribute to the specific heats of the molecules nor to the mechanism of wave propagation through the gaseous medium.

It is generally true that the internal energy modes of most molecules contribute fully to the specific heat of the molecules below 1 mc. p.s. At sound frequencies above 1 mc. p.s., there is a gradual lessening of the contribution of the internal energy modes of the hydrogen molecule to the specific heat until a certain frequency is reached (the molecular thermal relaxation frequency) where there is no contribution of the internal energy modes. Thus, at the thermal relaxation frequency, 10 mc. p.s. for a hydrogen molecule, the internal energy modes of the hydrogen molecules do not contribute to the specific heat of the molecule. The result is that the gaseous medium will, in the presence of hydrogen, have an effective change of its specific heat capacity and behave thermally as though composed of monatomic hydrogen molecules. The rate of velocity increase and the absorption of the acoustic wave will be at a maximum when the gaseous medium undergoes thermal molecular relaxation, as illustrated in FIGURES 2 and 3.

The velocity of sound through the gaseous medium, including hydrogen, will therefore be greater when transmitted at 10 mc. p.s. than when transmitted at 1 mc. p.s. If the gaseous medium does not contain hydrogen then the velocity of sound through the medium measured at 1 mc. p.s. and 10 mc. p.s. will be identical. However as soon as hydrogen is introduced into the gaseous medium, the velocity of the 10 mc. p.s. acoustical wave will increase proportional to the concentration of hydrogen in the gaseous medium.

The method as described herein can further be varied to detect the presence of hydrogen in a gaseous medium by measuring the magnitude of the phase shift of the 10 mc. p.s. acoustic wave relative to the phase shift of the 1 mc. p.s. acoustic wave. As was noted from considering FIGURE 3, the absorption of acoustic energy by a hydrogen air mixture is at a maximum when the acoustic energy is being transmitted at the relaxation frequency of hydrogen. This results in the phase shift of the 10 mc. p.s. acoustic wave being reduced considerably with respect to the 1 mc. p.s. acoustic wave. In order to practice this method the electronics must be altered to include an apparatus capable of measuring the phase shift, and the crystal separation of the 10 mc. p.s. transducer must be increased. This variation of the invention is mentioned for the reason that it will detect very minute quantities, .01% or less, of hydrogen in a gaseous mixture and thus provides a useful laboratory tool in the detection and quantitative analysis of hydrogen in gas mixtures.

This completes the detailed description of the invention wherein a preferred method for monitoring a gaseous medium for the presence of hydrogen has been described as well as general mention of possible variations thereto. It should be understood that there will be other variations possible in practicing the described method without departing from the spirit and scope of the invention as defined in the claims appended hereto.

What is claimed is:
1. A method of detecting the presence of a particular gas in a gas mixture comprising the steps of:
   (a) positioning a pair of ultrasonic transmitters and receivers separated by airgaps in an area to be monitored for the presence of the particular gas;
   (b) transmitting a first acoustic wave across one of the airgaps at the thermal molecular relaxation frequency of the particular gas to be detected;
   (c) simultaneously transmitting a second acoustic wave across the other of the airgaps at a frequency well below the thermal molecular relaxation frequency of the particular gas to be detected; and
   (d) receiving and comparing said first and second acoustic waves to detect any relative change therein caused by the presence in the airgap of the particular gas being detected.
2. The method recited in claim 1 wherein:
   (a) the relative change detected in the waves is the velocity of the acoustic waves.
3. The method recited in claim 2 wherein:
   (a) said first acoustic wave is transmitted at 10 megacycles per second.
4. The method recited in claim 3 wherein:
   (a) said second acoustic wave is transmitted at 1 megacycle per second.
5. A method of detecting the presence of hydrogen in a gas mixture comprising the steps of:
   (a) transmitting a first acoustic wave through the gas mixture at 10 megacycles per second, the thermal molecular relaxation frequency of hydrogen;
   (b) simultaneously transmitting a second acoustic wave through the gas mixture at a frequency of one megacycle per second; and
   (c) receiving and comparing the velocities of said first and second acoustic waves to detect any relative increase in the velocity of said first acoustic wave caused by the presence of hydrogen in the gas mixture.

References Cited

Bureau of Standards Technical News Bulletin article entitled "Propagation of Sound in Monatomic Gases," in September 1956, vol. 40, No. 9, pp. 121–124.

RICHARD C. QUEISSER, *Primary Examiner.*

C. IRVIN McCLELLAND, *Assistant Examiner.*